United States Patent

[11] 3,613,933

| [72] | Inventors | Erwin Pilz<br>Rastatt;<br>Klaus Vetter, Offenburg; Rudolf Pankratz,<br>Rastatt, all of Germany |
|---|---|---|
| [21] | Appl. No. | 802,312 |
| [22] | Filed | Jan. 28, 1969 |
| [45] | Patented | Oct. 19, 1971 |
| [73] | Assignee | Stierlen-Werke Aktiengesellschaft, Rastatt, Baden, Germany |
| [32] | Priority | Jan. 30, 1968 |
| [33] | | Germany |
| [31] | | P 17 53 152.1 |

[54] WARMTH-MAINTAINING UTENSILS
3 Claims, 3 Drawing Figs.

[52] U.S. Cl. .................................................. 220/4 R,
220/9 F, 220/97 C, 206/4
[51] Int. Cl. .................................................. B65d 7/00
[50] Field of Search .......................................... 220/9, 9 F,
4, 97, 97 C, 97 D, 97 F; 206/4, 65 K

[56] References Cited
UNITED STATES PATENTS

| 2,336,699 | 12/1943 | Neth et al. ................ | 220/4 E |
| 2,552,641 | 5/1951 | Morrison .................. | 220/9 F |
| 2,709,534 | 5/1955 | Johnson et al. ............ | 220/4 |
| 2,739,003 | 3/1956 | Clarke ..................... | 220/4 X |
| 2,750,064 | 6/1956 | Clarke ..................... | 220/4 |
| 3,145,870 | 8/1964 | Lockwood .................. | 220/97 F X |
| 3,120,570 | 2/1964 | Kennedy et al. ............ | 220/9 F X |
| 3,277,220 | 10/1966 | Plymale et al. ............. | 229/1.5 B X |
| 2,663,450 | 12/1953 | Bourcart ................... | 220/4 X |
| 2,962,183 | 11/1960 | Rill, Jr., et al. ............. | 220/9 F |
| 3,080,997 | 3/1963 | Brown ..................... | 206/65 K X |
| 3,326,408 | 6/1967 | Ringlen .................... | 220/97 F X |

FOREIGN PATENTS

| 836,063 | 6/1960 | Great Britain ............... | 220/97 F |
| 397,995 | 2/1966 | Switzerland ................. | 220/97 F |

Primary Examiner—Joseph R. Leclair
Assistant Examiner—J. R. Garrett
Attorney—Walter Becker ABSTRACT: A two-sectional implement for retaining the heat of food to be served, which includes a bottom section adapted to receive a plate with food, and a top section adapted to fit and to be placed upon said bottom section to form a closed chamber therewith adapted selectively to be opened and closed, each of said sections comprising an inner wall and an outer wall arranged in spaced relationship to said inner wall and defining therewith a permanently closed chamber, and synthetic hard foam material filling said permanently closed chamber.

INVENTORS
ERWIN PILZ
KLAUS VETTER
RUDOLF PANKRATZ

WARMTH-MAINTAINING UTENSILS

The present invention relates to an implement for retaining the heat of food and the like. For purposes of keeping warm the food in hospitals, nursing homes and the like, in which the food is distributed centrally, it is customary to surround the plates with an envelope for keeping the food warm so that the food will not be cold when reaching the respective patient sometime later. As envelope there is, as a rule, used an implement with a double-walled bottom portion of thin-walled high-grade steel while the space between said walls is filled with a heat insulating substance. The covering hoods of the heretofore known devices of the above-mentioned type are either single walled or double walled, and in the last-mentioned instance the hollow chamber is filled with heat insulating material.

The heat-retaining effect of the above-mentioned metallic implement is, however, unsatisfactory because the heat conduction in the wall is too high so that a heat equalization is effected indirectly between the food and the surrounding. Also, the frequently attempted employment of an envelope using an implement of the above mentioned general type made of synthetic material does not bring about any material improvement because the low strength of the synthetic substances require thicker walls so that the advantage of a lower heat conductivity is eliminated.

In view of the above, it became necessary to extend the heat-retaining time by means of heat-storing substances. Thus, heat-retaining implements of the above general type have become known in which the hollow chamber defined by the outer and inner wall means are entirely or partially filled with heat storage means or in which a heating disc heated up to a high temperature is loosely inserted to the lower portion of the implement. Both methods have considerable defects and drawbacks. With the first method relatively large storage masses are necessary in order to remain within tolerable limits as far as the necessary heating up of the implement is concerned, whereby the weight of the implement became rather high. With loosely inserted heating discs, the total weight can be reduced. The heating disc can be heated to a higher temperature, but the loosely inserted rather hot disc may cause accidents. In both instances, devices for heating the implement or heating the heating discs are necessary which increase the purchasing and operating costs of such implements.

Added to the above defects are drawbacks of a functional type, namely, the handling of heavy and hot implements of the type involved or additional heat-insulated handles are necessary. Furthermore, the food has to be overheated to an undesirable extent and may stick to the plates and the like which, of course, increases the difficulty of cleaning the same.

It is, therefore, an object of the present invention to provide a heat-retaining implement for retaining food and the like in hot condition, which will overcome the above-mentioned drawbacks.

It is another object of this invention to provide a heat-retaining implement as set forth in the preceding paragraph, which will not require the heating up of the implement.

These and other objects and advantages of the invention will appear more clearly from the following specification, in connection with the accompanying drawing, in which.

Figure 1:
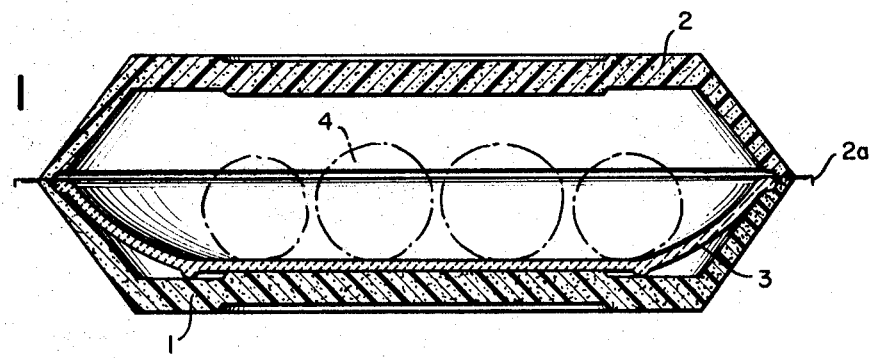
FIG. 1 is a section through a heat-retaining implement with an inserted food-containing plate.
Figure 2:
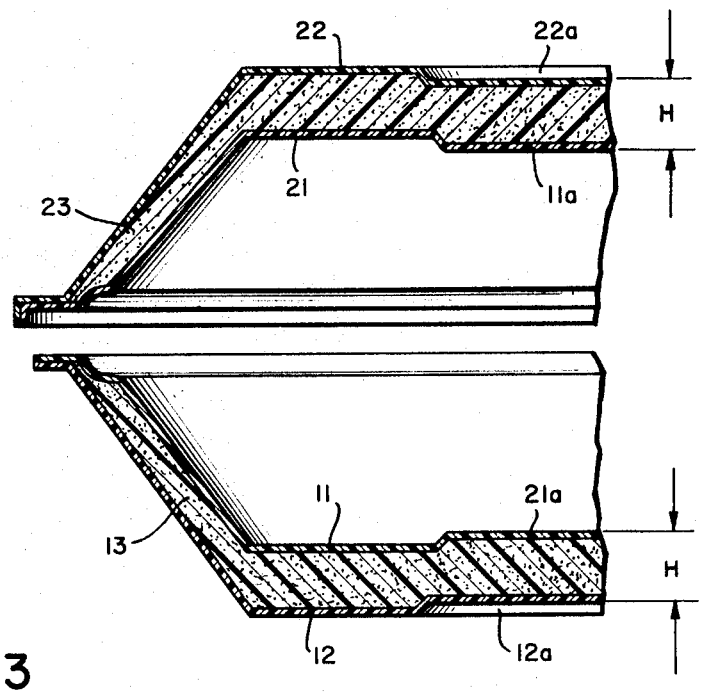
FIG. 2 illustrates on a larger scale than FIG. 1, a partial section through the implement of FIG. 1 while the cover hood is shown in slightly lifted-off condition.
Figure 3:
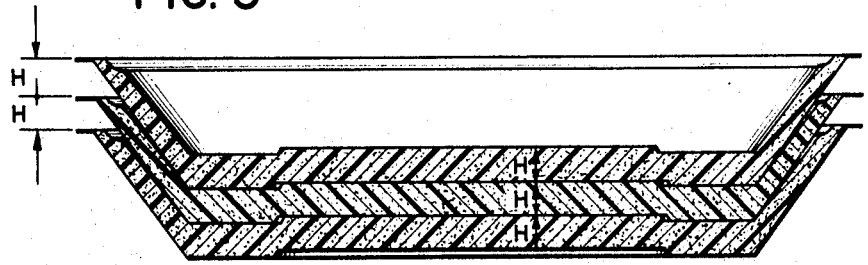
FIG. 3 shows a stack of a plurality of the lower members of a heat-retaining implement according to the invention.

In contrast to heretofore known heat-retaining implements, the present invention discards the storage of heat in the implement and aims at holding the heat capacity of said implement together with an optimum heat barrier as low as possible. More specifically, the heat-retaining implement according to the present invention is characterized in that the walls, especially the inner walls, of the implement are composed of thin synthetic material whereas the space between the outer and inner walls is filled with a synthetic hard foam of a low specific weight which adheres to said walls.

Referring now to the drawing in detail, the heat-containing implement according to the present invention is composed of a lower section 1 and an upper section or hood 2. The food-containing plate 3 which is heated to the desired temperature of the food is inserted into the heat-containing implement and thereby is encased in a manner blocking the heat conduction toward the outside. If the heat capacity of the implement is very low, but on the other side the heat-blocking capacity is very high the difference of the heat contents between the temperature at which the food was inserted into the implement and the temperature which the food has when reaching the patient will be sufficient to bridge the maximum time between food dispensing and food consumption without the necessity of taking additional steps.

In order to keep the capacity low, it is necessary that with a given specific heat, the weight remains low which simultaneously facilitates the handling of the implement. In this connection, a synthetic hard foam with a low volumetric weight is advantageous which has the advantage of low weight combined with high weight insulation. The unsatisfactory rigidity or strength of the synthetic hard foam is overcome in conformity with the present invention by the selected construction according to which thin walls 11, 12, 21 and 22 of compact synthetic material are in a good adhering manner connected to the easily breakable synthetic hard foam 13, 23 with the result that a body of high rigidity and stiffness is obtained.

For reasons of reducing weight and heat capacity and also for purposes of reducing conductivity it is important to keep the walls, especially the inner walls 11 and 21, as thin as possible. Numerous tests have shown that walls of synthetic material with a thickness of less than 1 mm. will lead to the desired effect and at the same time will assure sufficient strength. A very light synthetic hard foam with a volumetric weight below 50 kg. per cubic meter may be employed while again already a slight total thickness H below 15 mm. of the heat-retaining implement will assure a sufficient heat-retaining time. The shape of the heat-retaining implement with its flaring sidewalls is so selected that the total thickness H resulting from the total of the wall thickness and the hard foam thickness equals the stacking height with the surfaces of the sections substantially in contact.

Experience has proved that concentric depressions in the plane outer wall of the heat-containing implement greatly increases its rigidity and improves its standing stability. If such depression 12a, 22a are provided in the outer sides of the base portions 12, 22 and have associated therewith corresponding elevations 11a, 21a on the inside of the base portions it will be appreciated that the strength or rigidity of the implement will be further increased without increasing the total height and while retaining the same insulation thickness.

The tools necessary for making an implement according to the present invention can be reduced by making the lower member 1 and the cover hood 2 of identical shape. The protruding marginal area necessary for centering the lower and upper parts with regard to each other and for better sealing the gap between the upper and lower part and which is arranged on one of the two parts will then form the only difference between the upper and lower parts while causing no manufacturing difficulties. It will be appreciated that the implement part with a simple marginal or flat flange portion can easily be obtained from the other implement part by cutting off the additional marginal portion. It has proved advantageous to provide the cover or hood 2 with the additional rim portion 2a which is normal to the flat flange and which embraces the flange on the mating section.

Inasmuch as the heat-retaining implement according to the invention is not only advantageous over heretofore known devices of the above mentioned type with regard to handling and function, it can also be produced at a lower cost and is less sensitive in use.

While various types of forms may be used in connection with the present invention, ordinary polyurethane hard foam has proved highly successful in connection with the present invention. Furthermore, as integral foam, polyurethane-Duromer may be used. Similarly, while various types of synthetic materials may be used for forming the thin walls 11, 12, 21 and 22, experience has shown that in this connection it is highly, advantageous to make the said thin walls 11, 12, 21 and 22 of materials such as polyethylene, polypropylene, polycarbonate or polyacetal.

It is of course, to be understood that the present invention is by no means limited to the particular showing in the drawing, but also comprises any modifications within the scope of the appended claims.

What we claim is:

1. A two-section implement for retaining heat of food to be served, comprising top and bottom sections each formed with a base portion and sidewalls flaring outwardly from said base portion, the edges of said flaring walls having flat surfaces parallel to the base portions to form mating edges, the base portion and walls of one section being a duplicate of the base portion and walls of the other section, the body of each section being formed of foamed plastic material bonded to walls of plastic material on opposite sides of said foamed material, the base portion of each section having a raised central elevation on its inner surface and a complementary depression on its outer surface providing added strength of said base portion, said duplicate base portions and walls of said sections having complementary inner and outer surfaces so that a plurality of said sections may be stacked with their adjacent surfaces in near contacting engagement substantially throughout.

2. A two-section implement as claimed in claim 1, in which each of said sections has a planar flange bordering the free edges of said flaring walls and parallel to the base portion and providing flat surfaces in contact when said top and bottom sections are joined to form a food containing vessel, one of said sections having a marginal flange bordering said flat surface and normal thereto to receive the flat, marginal flange of the mating section.

3. A two-section implement as claimed in claim 1, in which said sections are reduced in thickness interiorly adjacent said mating edges so as to form a groove when said sections are joined with their mating edges in contact to receive the edge flange of a serving dish placed in said implement.